US006468082B1

(12) United States Patent
Denne

(10) Patent No.: US 6,468,082 B1
(45) Date of Patent: Oct. 22, 2002

(54) MOTION-IMPARTING APPARATUS

(75) Inventor: Phillip Raymond Michael Denne, Bournemouth (GB)

(73) Assignee: Advanced Motion Technologies, LLC, Ashton, MA (US)

(*) Notice: Subject to any disclaimer, the term of this patent is extended or adjusted under 35 U.S.C. 154(b) by 0 days.

(21) Appl. No.: 09/528,009

(22) Filed: Mar. 17, 2000

Related U.S. Application Data

(63) Continuation of application No. PCT/GB98/02823, filed on Sep. 17, 1998.

(30) Foreign Application Priority Data

| Sep. 17, 1997 | (GB) | 9719736 |
| Sep. 17, 1997 | (GB) | 9719737 |
| Sep. 17, 1997 | (GB) | 9719739 |
| Dec. 30, 1997 | (GB) | 9727446 |
| Dec. 30, 1997 | (GB) | 9727446 |
| Mar. 25, 1999 | (WO) | 99/14724 |

(51) Int. Cl.[7] .............................................. G09B 19/16
(52) U.S. Cl. ............................. 434/55; 434/57; 434/58
(58) Field of Search .............................. 434/55, 57, 58, 434/62, 67, 29

(56) References Cited

U.S. PATENT DOCUMENTS

| 3,952,979 A | | 4/1976 | Hansen ........................ 248/20 |
| 3,984,924 A | * | 10/1976 | Myles .......................... 434/55 |
| 5,568,993 A | | 10/1996 | Potzick ....................... 403/128 |
| 5,605,462 A | * | 2/1997 | Denne .......................... 434/55 |
| 5,656,903 A | | 8/1997 | Shui et al. ................ 318/568.1 |
| 5,829,982 A | * | 11/1998 | Advani ......................... 434/58 |
| 5,857,917 A | * | 1/1999 | Francis ........................ 472/60 |

FOREIGN PATENT DOCUMENTS

| DE | 19543876 | 5/1997 |
| DE | 19727344 | 2/1998 |
| EP | 0761266 | 3/1997 |
| FR | 2739428 | 4/1997 |
| WO | 93/01577 | 1/1993 |

OTHER PUBLICATIONS

Engstrand, "Pneumatics: A ForceBeyond Virtual Reality", Hydraulics & Pneumatics Jul. 1996, pp. 35–38.*
Engstrand, B., "Pneumatics: A force beyond virtual reality", pp. 35–38, Jul. 1996.
International Search Report for PCT/GB98/02823, Dec., 1998.

* cited by examiner

Primary Examiner—Derris H. Banks
Assistant Examiner—Kurt Fernstrom
(74) Attorney, Agent, or Firm—Darby & Darby

(57) ABSTRACT

An apparatus for imparting motion to a load comprises means for applying a force to the load and a compliant support for the load, in which there are provided means for effecting dynamic variation of the compliance of the support during operation of the apparatus so as to optimise the power efficiency. The apparatus may be capable of controlling relative motion in a plurality of degrees of freedom between a platform and a reference plane, the compliant means acting to support the weight of the platform, and the force-applying means being one or more actuators for applying perturbing forces between the platform and the reference plane. Control means act to control one or more actuators to move in one direction or the other to displace the platform with respect to the reference plane. At least part of the compliant supports may be a gas spring and in one embodiment this is in the form of a bellows supporting the platform.

17 Claims, 13 Drawing Sheets

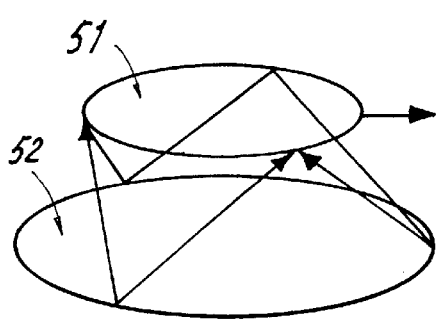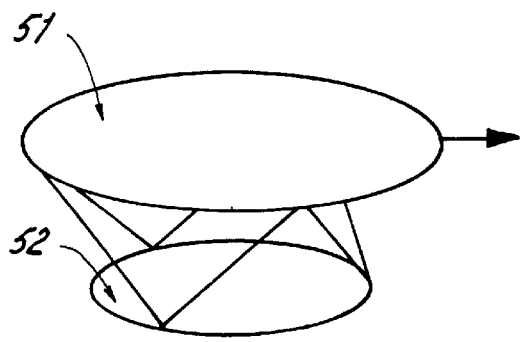
Fig. 12  Fig. 13
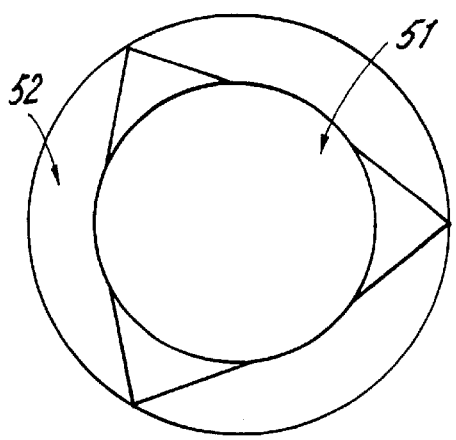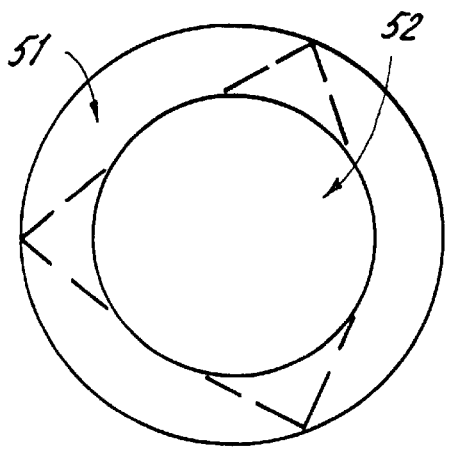
Fig. 14  Fig. 15
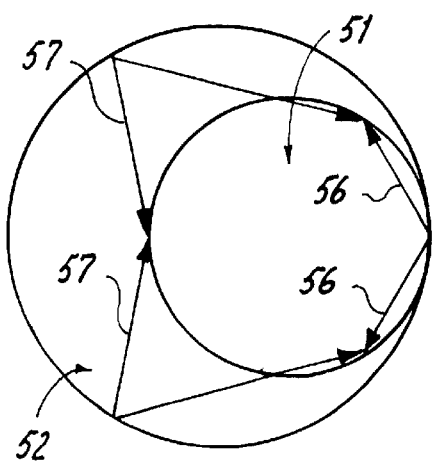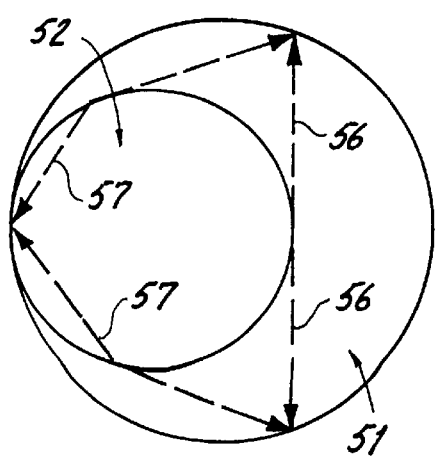
Fig. 16  Fig. 17

MOTION-IMPARTING APPARATUS

This is a continuation of International Application No. PCT/GB98/02832, filed Sep. 17, 1998.

BACKGROUND OF THE INVENTION

The present invention relates to motion-imparting apparatus of a type capable of imparting motion to a load for the purpose of positioning it or for the purpose of controlling or modifying its motion. The present invention finds applications in a wide range of devices including, for example, positioning devices of manufacturing machinery. Generally, such machinery does not require the device to do mechanical work on a material, (e.g. to cut it or to deform it) but rather to control the position of a mass which moves on a low-friction bearing system. Such machines are often required to carry out a precisely-defined positioning action at a high repetition rate and with a negligible error incidence. In such a machine the use of an electromagnetic ram has advantages over other types of actuator in that it is intrinsically simple in its construction, it has a zero backlash and it has a zero control transport lag. These valuable properties allow an electromagnetic actuator to produce rapid motion with extreme precision and reliability. It is possible to apply forces of more than 20 Tonnes to be applied at several meters per second with a positioning accuracy of a few microns.

Such apparatus is also used, for example, in simulators for training or entertainment. Typically in such use a platform is moved in relation to a static structure in order to create sensations of continuous movement for human occupants of a capsule affixed to the moving platform. Such mechanisms are also used in the testing of suspension systems and stabilising apparatus, whereby the motion platform is used to create calibrated disturbance accelerations, against which the operation of the stabilising mechanism requires to be tested. The moving platform of motion-imparting apparatus is normally actuated by an array of actuator units or "rams" which may be driven by hydraulic fluid or gas under pressure, or by ram-like devices which are electrically operated by means of a ball-nut and screw mechanism. More recently, apparatus has been designed to use a geared-down crank fitted to rotary motor, or to employ direct electromagnetic interaction between a moving piston-shaped armature and a cylindrical stator. In the case of the latter electrical and electromagnetic machines, there is a requirement for the motion-imparting apparatus to be supported against the gravitational forces acting upon the capsule and its occupants by some means. This is important because energy would otherwise be continuously consumed within the electrical machine in order to create the thrust required to counteract the constant gravitational force acting upon the capsule. This would soon cause the motors to overheat. This effect is also encountered in other applications.

One attempt to solve this problem is described in International Patent Application published under WO93/01577. This document describes a technique that carries the load of the motion platform on a counterbalancing mechanism having a low effective spring rate. As a particular example a cranked gas spring system is described therein. Experience with mechanisms that have been constructed in accordance with the disclosure of WO93/01577 has shown that the concept of counterbalancing described therein does not provide optimal support for an electromagnetic motion base. The present invention, in one concept, is based on the realisation that a controlled spring (or a set of controlled springs) with a significant spring rate is required for optimum support.

Hitherto, a number of designs of electromagnetic actuator, or linear motor, have been produced. Various configurations of previous machines have been described in documents such as WO93/01646, which discloses an electromagnetic device arranged to operate with cylindrical symmetry as a piston-in-cylinder machine. The principal advantage of that form of construction is that the strong attractive forces between the permanent magnets within the machine and the magnetic materials that surround them are balanced about a central axis, so that the bearings of the machine do not need to withstand any large magnetic forces.

A further advantage of the cylindrical construction is that the magnetic fields of the machine are contained within the outer steel case of the actuator or ram and that they can be arranged to intersect the electrical coils of the machine with a high degree of efficiency.

Yet another advantage of the cylindrical construction is that the armature of the ram may carry a sliding seal between it and the inside surface of the stator of the ram so as to form the piston of a fluid actuator device. This is beneficial when there is a requirement to produce fast-acting electromagnetic forces that are superimposed upon or intermittent with steady or slowly-changing forces. The latter types of force are better produced by means of a fluid actuator. The electromagnetic elements would otherwise be required to consume electrical power continuously if they were themselves to provide the static or slowly-changing force.

Further, the cylindrical, piston-in-cylinder construction is appropriate to the application of the ram in of many industrial control applications where hydraulic or pneumatic rams are now employed. This is because the magnetic fields of the ram are wholly-contained within the cylindrical casing, so that the ram is tolerant to the presence of swarf or other magnetic dust that is a problem to other types of electromagnetic linear actuator.

The present invention seeks to provide a structure in which the cylindrical stator cavity of an electromagnetic actuator is divided into two parts by a seal on the piston/armature element, and includes means by which the armature assembly may also act as the force-producing element of a fluid pressure control system for example as part of a gas spring.

It is to be noted that WO93/01646 and its associated co-pending application WO93/01577 describe a ram construction for application to motion base machines in which the gas spring property of the ram is conceived to act in one direction only, so as to support the weight, that is to resist a gravitational force. For this purpose WO93/01646 describes the construction of a passage for fluid flow connection of only one part of the ram cylinder (namely the underside of the piston) to a pressurised fluid reservoir forming part of a gas spring. Both WO93/01646 and WO93/01577 describe that the upper part of the piston is allowed to vent to atmospheric pressure, directly or via an exhaust reservoir.

It is desirable to have. a more efficient method of controlling the motion of an actuator simulator mechanism than that of WO93/01577, using a combination of air pressure and electromagnetic forces in which the individual forces and force gradients of the gas springs are optimised in relation to the dimensions of the load so that the energy consumed by the mechanism is at a minimum. For this purpose the gas springs acting beneath the piston of each ram should not be designed solely for the support of the load as in WO93/01577 but rather should function as temporary reservoirs in which the potential energy resulting from the electromagnetic action of the rams is stored and from which it can be recycled a short time later. This energy recycling technique results in an economy of power consumption which improves the performance and reduces the costs of construction and operation of an electromagnetic actuator.

OBJECTS AND SUMMARY OF THE INVENTION

In one aspect, therefore, the present invention seeks to provide a motion-imparting system in which a continuous load component is supported in an especially effective manner. It is a feature of embodiments of this invention that as applied to so-called motion-bases they have a form which is easily adapted to support a variety of capsule shapes, which is physically stable and robust, which has an enhanced ability to produce large angles of pitch and roll motion and which is easily accessible for inspection and service.

According to one aspect of the present invention there is provided apparatus for imparting motion to a load comprising means for applying a perturbing force to the load and a compliant support for the load, in which there are provided means for effecting dynamic variation in the compliance of the support during operation of the apparatus.

In one embodiment of the invention the force-applying means is an electromagnetic actuator. For many applications a linear electromagnetic actuator may be preferred although a rotary actuator may alternatively be employed.

In any such case the variation in compliance may be controlled by signals generated as an integral of a position demand signal applied to the electromagnetic actuator.

For this purpose it is preferred that the variation in compliance is controlled in dependence on the electrical current required to move the electromagnetic actuator against the load.

The compliant means may be a gas spring and the variation in compliance is achieved by varying the mass of gas contained within a chamber of variable volume.

Such variation may be achieved by controlling valves which allow gas into and/or out from the said chamber.

Although the compliant support may incorporate a fluid actuator, possibly an hydraulic actuator, the working fluid of which can be directed towards or away from the actuator to vary the compliance thereof.

Variation in compliance may be achieved, for example, by the adjustment of pressures in individual gas springs. In one embodiment this is effected in accordance with the time integral of the currents drawn by electromagnetic actuator during motion. By this means the characteristics of the compliant support means are optimised so as to allow the electromagnetic rams to operate within their ratings and to reduce the power consumed by the complete mechanism.

In one embodiment of the present invention incorporating an electromagnetic actuator, the armature and stator of the electrical machine comprise a piston in cylinder device, the piston or armature being shorter in length than the cylinder or stator and being wholly contained within it at all times, the cylinder being closed at both ends by end members, the piston being provided with a rod or thrust element extending through at least one of the end members and being provided with an air seal or air seals to said end members, the armature or piston element being also provided with an air seal whereby to divide the cylinder into two chambers, the armature including first means for producing a magnetic field pattern comprising at least two magnetic poles of opposite polarity and if more than two poles then comprising magnetic fields so arranged as to be of alternating polarity along at least part of the axial length of the armature and the stator being provided with second means for producing a further magnetic field pattern of at least two poles of opposite polarity and if more than two magnetic poles then poles so arranged as to be of alternating polarity along at least part of the axial length of the stator, the second field pattern being so arranged as to interact with the first magnetic field pattern so as to produce an axially-directed force.

Preferably the physical and the electrical parameters of the device are so arranged that the electrical terminals may be connected to one or more conventional electronic drive units for controlling the phase and amplitude of at least one of the magnetic field patterns so as to cause a desired axially-directed electromagnetic force to be created between the piston and the armature.

Preferably the two chambers, one on each side of the piston and having a volume variable in accordance with the position of the piston within the cylindrical armature, are provided with pipe connections so that the mass of the fluid within them may be controlled. This allows the piston to perform simultaneously as an electromagnetic device and as a double-acting fluid ram.

According to another aspect of the present invention, therefore, there is provided apparatus for controlling relative motion with a plurality of degrees of freedom between a platform and a reference plane, comprising compliant means for supporting the weight of a platform, one or more actuators for applying perturbing forces between the platform and the reference plane, and control means for controlling the or each actuator to move in one direction or the other whereby to displace the platform with respect to the reference plane, characterised in that the compliance of the compliant support means is variable, and there are: provided means for dynamically varying the compliance thereof in dependence on control signals applied thereto.

In embodiments formed as a motion-base there may be three actuators between the motion platform and the fixed reference plane, which may be a fixed part of the mechanism. The actuators have pivots or hinges connecting them to that part of the apparatus defining the fixed reference plane so as to constrain the locus of motion of the actuator within a respective plane. The three planes thus defined intersect along a vertical line joining the centroid of a lower triangle formed by the pivots of the actuators to the centroid of the motion platform triangle formed by the points of connection of the upper ends of the actuators. The upper ends of the actuators have joints providing universal freedom, so that by choice of the three individual actuator lengths the motion platform can be caused to adopt any chosen attitude within reasonable limits of heave, pitch and roll motion. The centre of mass of the load is preferably positioned to lie above and close to the centroid of the motion platform and having a supporting member connected with universal freedom between the centroid of the lower fixed triangle and the centroid of the upper (motion) triangle, the compliance of the supporting member being optimised according to the dimensions of the motion platform.

In a preferred arrangement the upper motion triangle, defined by the ends of the actuators, is smaller in size than the corresponding triangle on the fixed part of the mechanism defining the reference plane, so as to allow actuators of limited stroke to produce acceptable deviations of the motion platform in pitch and roll and to simplify the problems of affixing a capsule to the motion platform.

Preferably the angle between the actuator and the horizontal plane in the straight and level (operating) position of the motion platform is approximately 45°. The central support may be a simple member or an assembly and may be a metal or plastics spring, a pneumatic ram or a ram in which a liquid acts on a piston in the actuator, the surface of the liquid distant from the piston being pressurised by a gas within a reservoir.

Alternatively the compliant support may be a bellows unit, with the advantage that no universal joints are required at the interfaces of the bellows unit with the fixed and moving platforms, and the collapsed length of the bellows may be less than half its extended length. Moreover, a bellows needs no internal sliding seal like that required for a sliding piston. As another alternative, or in addition, the central support may be formed from a plurality of pressurised gas struts, so arranged as to provide an over-centre toggle action that removes most of the supporting force when the motion platform adopts the minimum height or loading position.

Preferably the actuators are electromagnetic actuators and are designed to have sufficient reserve capability of thrust so as to be able to accommodate practical deviations of the position of the centre of mass of the motion platform from the ideal position close to the exact centroid of the upper motion triangle.

It will be understood that when a motion-imparting system (hereinafter referred to as a motion base) is in operation there is a central, straight and level position to which the capsule must be continually returned. The occupant or occupants of the closed capsule is or are not aware of this continual centering action, which is carefully controlled to blend into the background of the other motions. It takes as much energy to return the capsule to its starting position as it took to move it away in the first place and this energy may be stored in a spring system. Further, because the centre of mass of the payload is invariably above the centroid of the motion platform, there is a significant torque that aids any pitch or roll movement, which must be opposed by means such as spring action. Nevertheless, the restoring forces produced by the spring suspension must not be too great or else they will demand disproportionately large actuator forces to cause the initial exursions.

When attempts have been made to apply the principles of WO93/01577 to a common form of six-ram, six-axis motion platform (known as a Stewart Platform after its designer), a number of difficulties have been encountered. In particular, it has been demonstrated that if the static load exceeds a certain well-defined limit, depending on its height above the centroid of the motion platform, the mechanism has a tendency to "nose-dive" by a combined forward and pitching motion, from which it cannot recover by electromagnetic forces alone. This defect imposes a strict limit on the payload capacity—and therefore the usefulness—of the machine.

In another aspect, therefore, the present invention provides a motion-imparting system having six degrees of freedom using six actuators arranged as first described by Stewart, in which the concept described in International Patent Application WO93/01577 namely the weight counterbalancing system is not applied, but in which the forces for supporting the static load are applied in a different, specific and efficient manner, which greatly reduces the electromagnetic power demands on the actuators for any given payload, thus raising the payload limit and improving the dynamic performance of the apparatus.

According to another aspect of the present invention, therefore, there is provided apparatus for controlling relative motion in a plurality of degrees of freedom between a motion platform and a reference plane, comprising means for supporting the weight of the motion platform, one or more actuators for applying intermittent forces between the platform and the reference plane, and control means for controlling the or each actuator whereby to vary the position and/or orientation-of the platform with respect to the reference plane, characterised in that the means for supporting the weight of the motion platform comprise respective compliant support members each associated with a respective said actuator.

In the present invention, in the idealised case of a Stewart platform, three points of the motion platform that lie on a triangle are connected to three corresponding points defining a triangle on the part of the mechanism defining the reference plane by means of six electromagnetic actuators having joints providing universal freedom at the interfaces between the actuators and the fixed platform and similar joints between the actuators and the motion platform, so that by choice of the six individual actuator lengths the motion platform can be moved to adopt a wide range of orientations by motion which may be any one, or any combination of, motions commonly known as heave, surge, sway, yaw, pitch and roll motion. The centre of mass of the load is preferably positioned to lie above and close to the centroid of the motion platform, and the diameter of the motion platform circle preferably has an optimum ratio to the diameter of the fixed reference plane circle. The term "circle" of the platform or plane is here intended to mean the circumscribing circle around the points of attachment at the ends of the actuators to, the platform or the reference plane. Each electromagnetic ram may be associated with an individual spring or be so designed and assembled to the motion base as to act also as the output actuator of an individual spring, the springs being such as to support the weight of the motion platform (and any load thereon) in the central straight and level position.

It is a feature of the present Invention that the spring rates are optimised in relation to the power consumption of the apparatus and the forces exerted by each individual spring are preferably adjustable by a monitoring system so as to reduce to zero the integral of the associated actuator current over a chosen time interval.

Preferably the upper motion circle is smaller in size than the corresponding circle on the fixed part of the mechanism defining the reference plane and the ratio of the two radii is chosen to optimise the power demand. The optimum ratio of base dimensions is close to 1:1.5.

Preferably the actual values of the two radii are chosen such that the angle between the actuators and the horizontal plane when all six actuators are at 50% extension is approximately 45 degrees.

If a gas spring suspension is employed, preferably the ratio of the sealed volume of each gas spring system when the actuator is fully extended to the sealed volume when the actuator is fully retracted is also chosen to minimise the operating power consumption of the apparatus. This optimum ratio of gas spring volumes is considered to be in the vicinity of 1.8.

Preferably means are provided for monitoring the magnitude and direction of the electrical current demand for each actuator and the pressure in each gas spring is arranged to be frequently adjusted during operation in relation thereto, so as to maintain an integrated symmetry of electrical power demand over a chosen period of time.

In embodiments of the present invention, three points of the motion platform may be connected to three corresponding points on the fixed part of the mechanism defining the reference plane by actuators having universal freedom at the connection between the actuators and the reference plane and between the actuators and the motion platform, so that by choice of the three individual ram lengths the motion platform can be moved to adopt any chosen attitude within the limits of movement of the actuators in heave, pitch and roll motion. The centre of mass of the load is preferably positioned to lie above and close to the centroid of the motion platform and preferably has a supporting member connected with universal freedom between the centroid of the reference plane and the centroid of the rotation platforms. In this context it is assumed that the centroid of a platform or plane is the centroid of the triangle defined by the three points of connection to the three (or six) actuators. The spring rate of the support is preferably optimised to the parameters of the platform and the load.

In a preferred embodiment the triangle of actuator connections to the motion platform is smaller in size than the corresponding triangle on the fixed part of the mechanism defining the reference plane, so as to allow actuator rams of limited stroke to produce acceptable deviations of the upper platform in pitch and roll and to simplify the problems of affixing a capsule to the motion platform. Preferably the ratio of the size of the fixed (base) platform defining the reference plane to that of the motion platform is approximately 1.5:1

Preferably the angle between the actuators and the horizontal plane when all three actuators are in the straight and level (operating) position of the motion platform is approximately 45°.

Preferably the central support is a bellows unit. This has the advantage that the upper and lower ends of the bellows may be fixed directly to the motion platform and to a fixed base defining the reference plane. The collapsed length of the bellows may be less than half its extended length and there is no need for an internal sliding seal. It will be understood that one of the characteristics of a bellows assembly is that in an upright or vertical axis orientation it will permit vertical motion and the upper end of the bellows may be tilted at any pitch or roll angle with respect to the lower end, but it will not readily permit lateral translation (surge or sway) nor will it permit axial rotation (yaw) at all. Thus a bellows assembly may function both as a gas spring unit and as a restraint mechanism.

Preferably the actuators are electromagnetic rams designed to have sufficient reserve capability of thrust so as to be able to accommodate practical deviations of the position of the centre of mass of the motion.platform from the ideal position close to the exact centroid of the upper motion triangle.

BRIEF DESCRIPTION OF THE DRAWINGS

Various embodiments of the present invention will now be more particularly described, by way of example, with reference to the accompanying drawings, in which:

FIG. 12 is a schematic view of the embodiment of FIG. 10 shown in a first operating configuration;

FIG. 13 is a schematic diagram illustrating a further embodiment in which the reference plane is smaller than the motion platform;

FIG. 14 is a plan view from above of the embodiment of FIG. 12;

FIG. 15 is a plan view from above of the embodiment of FIG. 13;

FIG. 16 is a plan view from above of the embodiment of FIG. 12 shown with the motion platform displaced to the right;

FIG. 17 is a plan view from above of the embodiment of FIG. 13 with the motion platform displaced to the right with reference to the configuration shown in FIG. 15;

DETAILED DESCRIPTION OF THE PREFERRED EMBODIMENT

Figure 1:
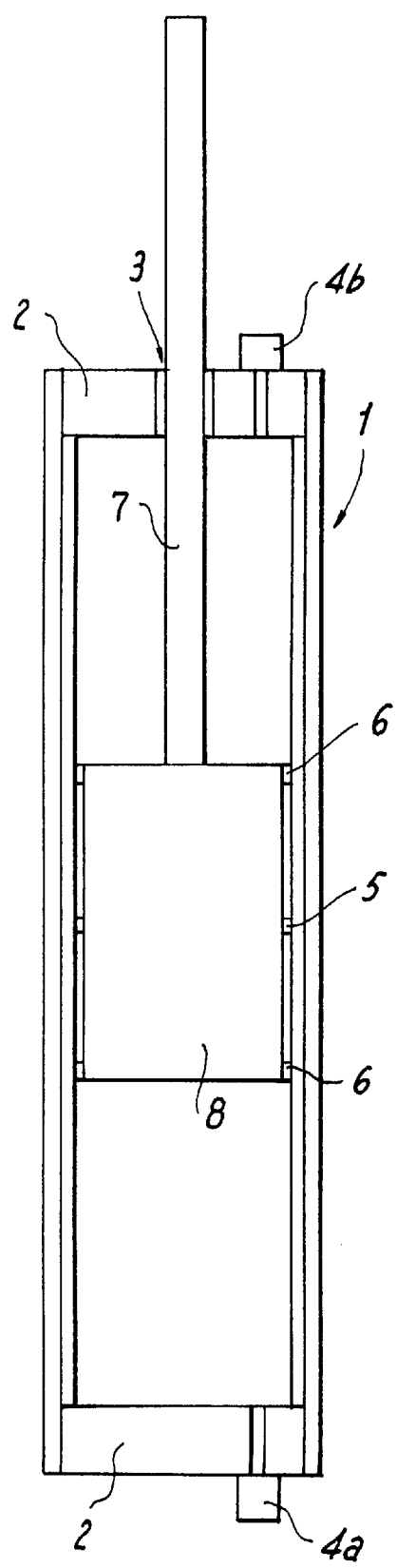
FIG. 1 is an axial sectional view of an actuator formed as an embodiment of the present invention.

Referring now to the drawings, the actuator shown in FIG. 1 comprises a piston or armature 8, moving within a cylinder or stator 1. The piston is connected to a rod or thrust tube 7, which extends through one of the end pieces 2 via an air seal 3. A seal ring 5 is fitted to the piston 8 so as to divide the cylinder into two chambers which are pressurised or evacuated as appropriate via pipe connections 4a, 4b. The piston is also fitted with bearing rings 6, whose function is to constrain the position of the piston so that it moves smoothly along the central axis of the device.

It will be understood that when the ports 4 are closed, the action of the air seal 5 will cause motion of the piston within the cylinder to compress the gas in one of the chambers whilst allowing the gas in the opposite chamber to expand. In either case a force will be created which tends to restore the piston to its datum position in the absence of electrical power. By adjustment of the mass of the gas sealed within the two chambers, the forces produced by the two springs may be predetermined and by choice of the ratio between the two charging pressures the datum (or balance) position may be preset. When it is necessary to reduce the gas spring rates to a low value, the construction of the end members 2 is modified to allow the connection of an external reservoir to each chamber.

Means whereby the pneumatic valves (not shown) in the lines connected to the ports 4 may be controlled in accordance with the electrical currents drawn by the ram when powered by a drive unit for cyclic or pseudo-random positioning of a load will be described hereinafter. By providing a facility for quasi-continuous adjustment of the parameters of the opposing gas springs, in relation to the symmetry of the electrical drive currents in a ram, it is possible to minimise the power consumed by the ram, thereby effecting significant economies in its physical specification.

Figure 2:
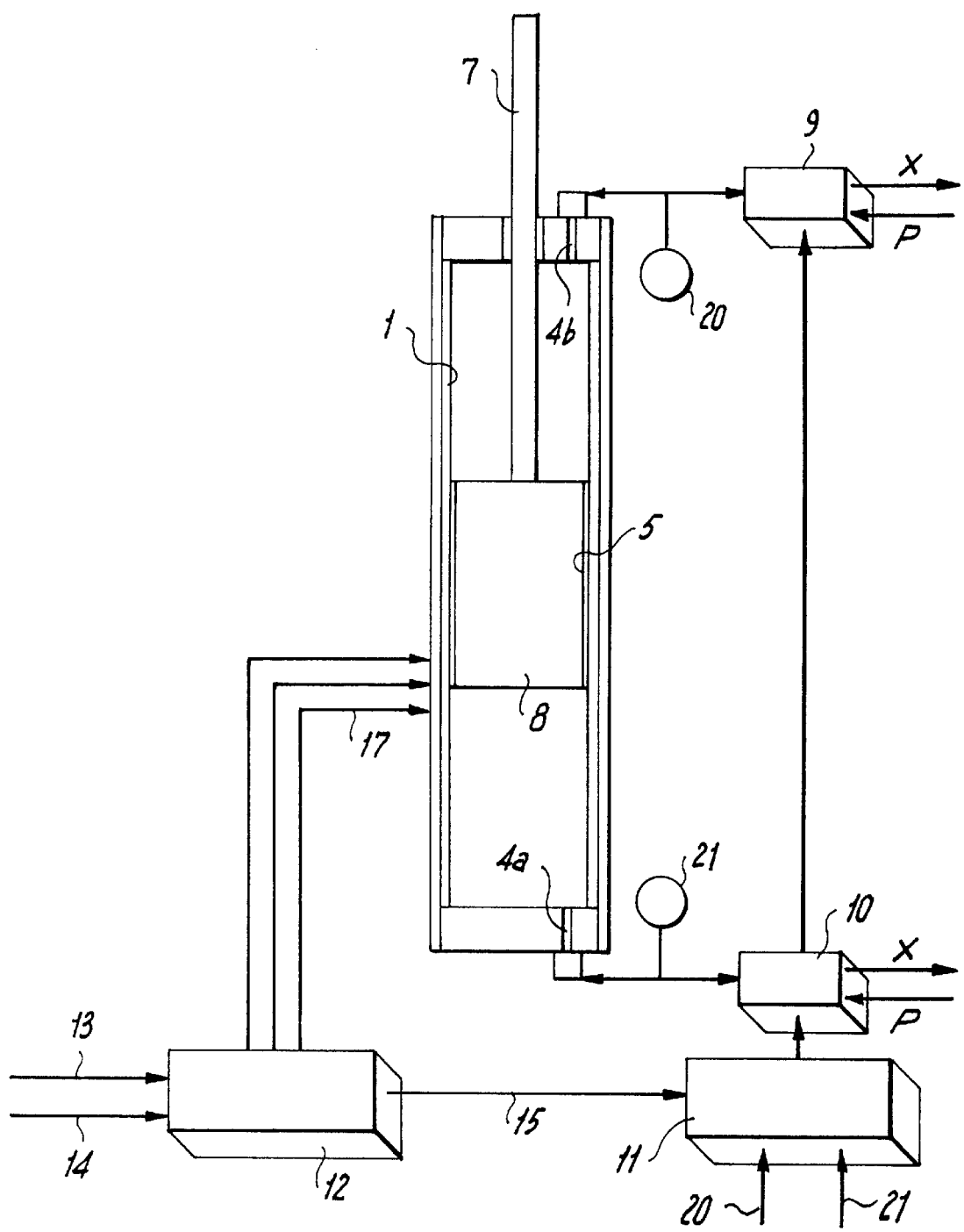
FIG. 2 is a schematic view of an actuator and control components formed as a second embodiment of the invention.

In FIG. 2 the invention is shown applied to an electromagnetic ram. The piston 8 carries a seal 5 by which the interior of the cylinder 1 is divided into two chambers A and B. The mass of gas in each chamber is controlled by valves 9 and 10 which are powered by pressure control unit 11. The electromagnetic forces produced by the ram are controlled by unit 12, which receives position commands 13 and position feedback signals 14 from a suitable transducer (not shown) linked to the ram output rod or thrust tube 7. Unit 12 provides power to the ram along control lines 17. Signal 15, produced by the ram positioning controller 12, is a significant process parameter upon which the pressure-control unit 11 is designed to act, as described below by way of example.

If the ram is used as part of a motion base of the kind referred to above the volume of chamber B is allowed to remain at atmospheric pressure. The valve unit 9 is not present and port 4b to chamber B is arranged to have a large bore so that air may pass freely to and from the surrounding environment. Indeed the ram may be constructed so as to eliminate chamber B entirely by adopting an open-ended configuration. In order to achieve a sufficiently low spring rate, it may be necessary for chamber A to be connected via a wide-bore tube to an external reservoir. Similar considerations apply to industrial applications in which the ram is required to support a load on a vertical or approximately vertical axis, or to other applications such as lifts, for example.

The controller 11 then acts via valve unit 10 to increase the mass of gas in chamber A when the parameter 15 indicates that the current demand by the actuator is predominately in the direction which would increase the volume of chamber A, and vice versa. It will be understood that by this means the pneumatic system reduces to a minimum the current demanded by the ram and increases the efficiency of the system. It will also be understood that the arrangement is tolerant to pneumatic leaks in either direction, to temperature changes and to changes in the operating cycle or to the quasi-random sequence of movements made by the ram. It is self compensating for changes in the value of the deadload and adaptive to the movement of the ram into a "parking" position at any time. A mathematical analysis of the system also demonstrates that the pressure adjustment is tolerant to errors in the region of final balance and that the control loop is highly stable.

Now consider the case in which the ram does not experience a steady (e.g. gravitational) force that tends to reduce the volume of chamber A. For example, the ram may be used to position an inertial load over a repetitive cycle on a horizontal track that has a small coefficient of friction.

Controller 12 is then required to calculate the mean position of the ram from the values of the position transducer signals 14, averaged over at least one whole cycle of movements, or in the case of pseudo-random motion, over a significant time interval. Controller 12 is then required to measure the instantaneous current drawn by the ram and to multiply this value by the distance of the ram from the computed mean position at that time. The rolling sum of these products (or "current moments") is then passed to the valve controller 11 as the process parameter 15.

The controller 11 then acts to increase the mass of gas in chamber A when the parameter 15 indicates that there is a predominance of current demand in a direction of force which would tend to move the ram towards its central position by increasing the volume of chamber A. Controller 11 is arranged to decrease the mass of gas in chamber A if the opposite predominance is indicated.

The pressure in chamber B is arranged to be such that the pressures on the two opposite sides of the piston 8 are balanced when the ram is at rest in its computed mean position.

As illustrated in FIG. 2 the system includes pressure transducers 20 and 21 teed into the lines from valve assemblies 9 and 10 via low-pass filters (not shown). Transducer 20 indicates the mean pressure in chamber B and transducer 21 indicates the mean pressure in chamber A. Controller 11 then acts on valves 9 so that the value of pressure 20, multiplied by the area of the piston surface in chamber B is equal to the value of pressure 21, multiplied by the area of the piston surface in chamber A. It will be understood that this balancing function may also be carried out more simply by using diaphragm-actuated pneumatic pressure controllers having a preset ratio facility, which may be a preferable arrangement in some machine applications.

External reservoirs, whose function is to decrease the spring rate of the gas springs, may or may not be connected to chambers A and B, according to the dynamic force profiles required of the system.

Figure 3:
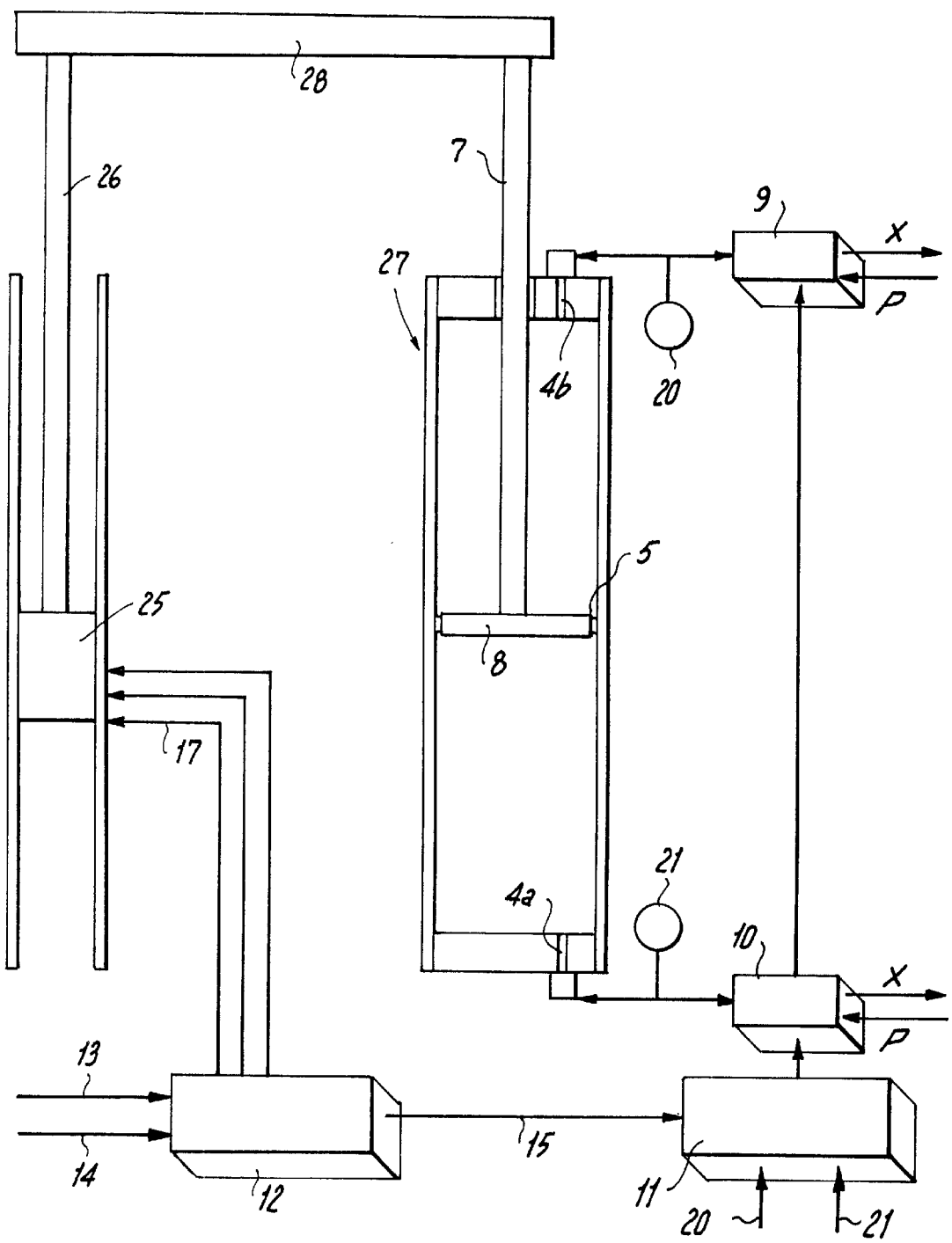
FIG. 3 is a schematic view of an alternative control configuration for an actuator.

FIG. 3 shows the invention applied to an electric linear motor drive that is not constructed in a form that allows pneumatic forces to be applied directly to the drive output. For example, the linear motor may be of the open, flat configuration, using a permanent-magnet armature suitable for connection to a three-phase servomotor drive unit. In this case the linear motor 25 and its output element 26 are coupled by suitable means 28 to a pneumatic ram 27, having a piston 8 and chambers A and B etc. as hereinbefore described.

The mode of operation is the same. If the load is predominately constant (e.g. gravitational), chamber B of the ram 27 (which forms the output element of the gas spring system) is vented to atmosphere and the mass of gas in Chamber A is so controlled as to balance the current demands for thrust in opposite directions. If the load is predominately inertial, the pressure in one chamber is controlled so as to balance the moments of the current demands about the mean position of the actuator and the pressure in the other chamber is adjusted to balance the forces on the piston 8 at the mean position of the system.

Figure 4:
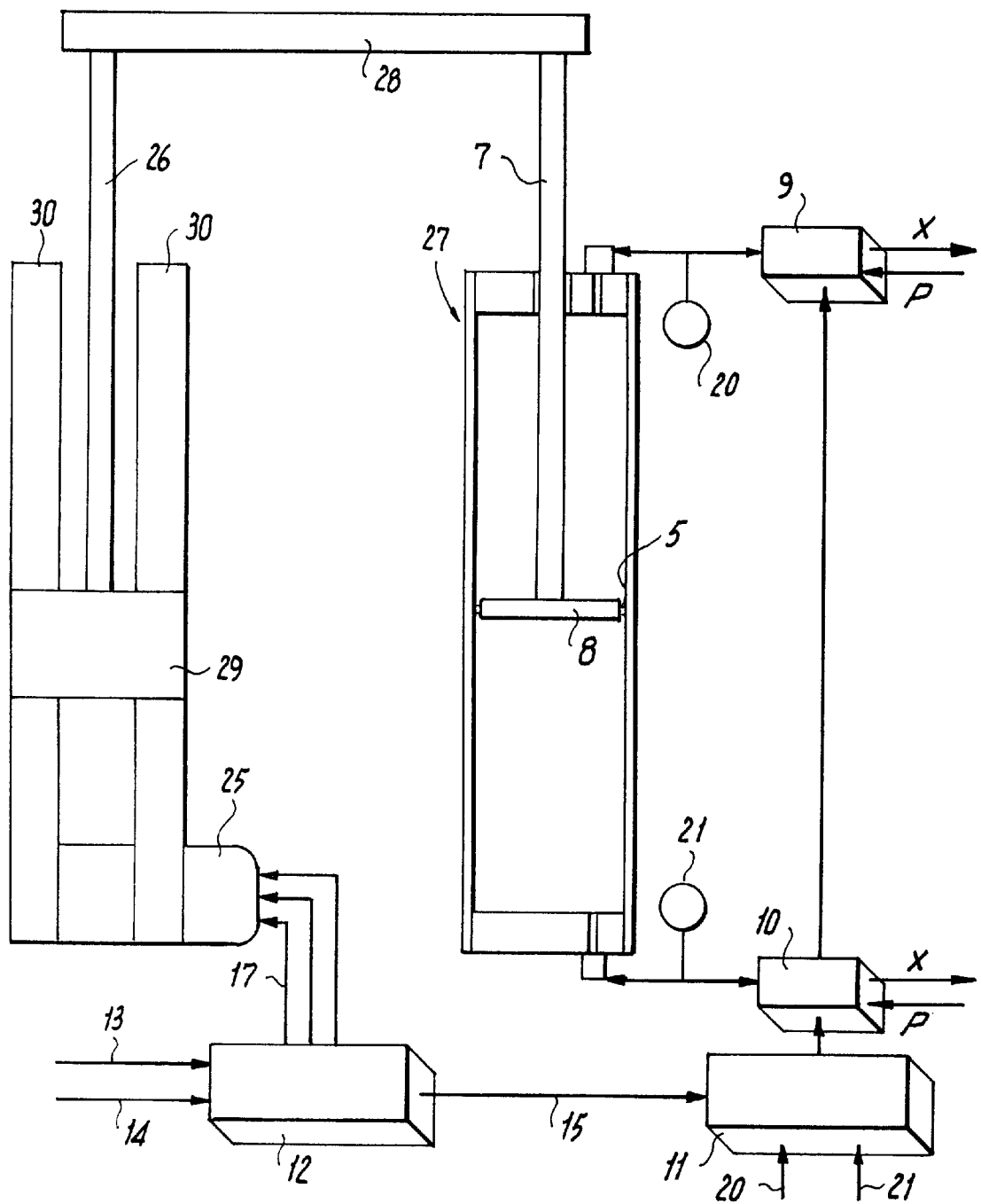
FIG. 4 is a diagram illustrating a further control configuration.

FIG. 4 shows the invention applied to a linear positioning device powered by a rotary motor. In this example we choose a belt-driven arrangement, but the invention may be applied equally to a geared crank drive or to a ballscrew actuator, for example.

Here the rotary motor 25 moves the carriage 29 by means of belts 30. The output element 26 is coupled to the gas spring by a suitable connection 28. The operation of the system for gravitational or inertial loads is as previously described, the various element numberings having the same significance as heretofore.

It will be understood that the invention is not restricted to machines in which the whole of the spring force is provided by the gas spring or springs controlled by unit 11 and valves 9 and 10. It may be preferable for the machine of which the positioning mechanism forms a part to be fitted with additional springs, whether gas or metallic, whose characteristics are preset to provide part of the energy-storage reservoir of the mechanism.

It will be understood that the whole of the spring force needed for the efficient operation of the machine may be provided by metallic springs or by gas springs which are manually set to the correct values by a trained person who observes the current drain characteristics of the electrical motor in order to make that adjustment.

Figure 5:
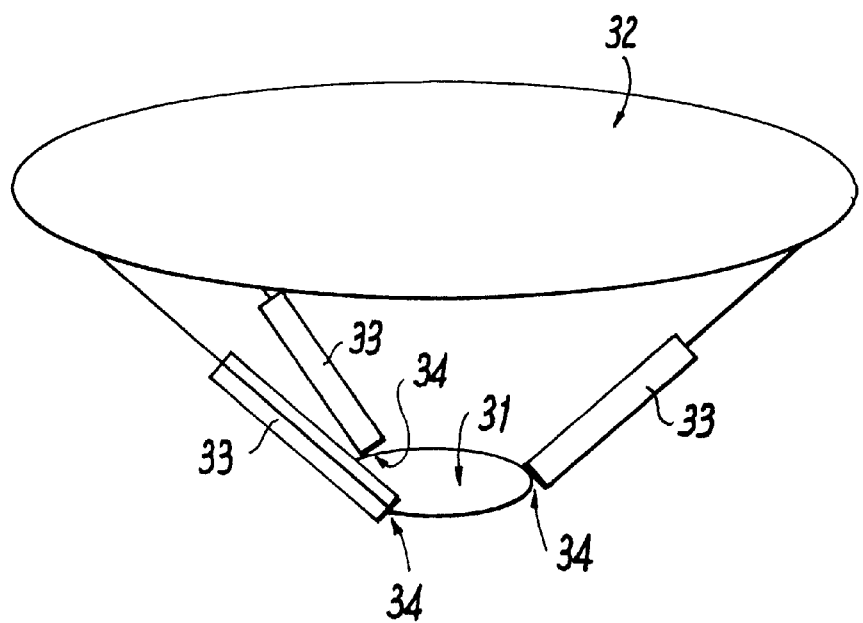
FIG. 5 is schematic perspective view of a prior art configuration of a motion-imparting device.

Referring now to FIG. 5 the stationary or base platform is referred-to by the numeral 31 and the moving platform is referred-by the numeral 32. The rams 33 form the interconnections between the stationary and moving elements. It will be appreciated that by enforcing appropriate variations in the lengths of the rams the attitude and position of the moving platform may be changed in relation to the stationary platform. It will be appreciated that as each ram extends or retracts the angle between that ram and the horizontal surface must change. The rams rotate in vertical planes about their lower hinges 34.

Figure 6:
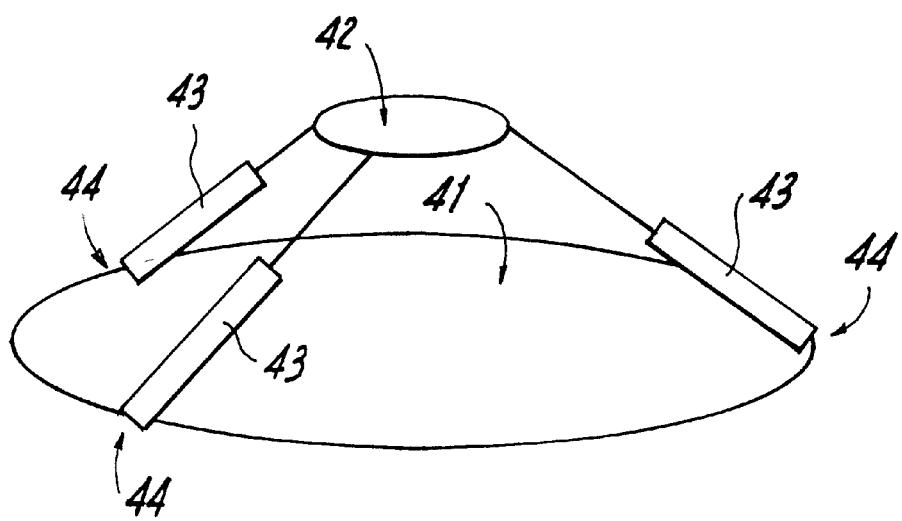
FIG. 6 is a schematic perspective view of an alternative configuration of motion-imparting device known from the prior art.

In order to enhance the pitch and roll abilities of the platform and to improve the accessibility of the mechanism for construction, service and maintenance, it is a feature of this invention that the tripod is constructed so that it adopts the more conventional form illustrated in FIG. 6. In this Figure the upper platform 42, is now smaller than the lower platform 41. It will be observed that the hinges or pivots at the lower ends of the rams 43 (which are the machine elements that carry the greatest stresses) are at the outer extremes of the motion base, making them and the main bodies of the rams more accessible for assembly, inspection and maintenance. It will also be observed that the surface of the fixed platform is uncluttered and unobstructed by restraint frames, allowing clear access to the central area if required. A further advantage of this configuration is that the area of interface between the motion platform and the simulator capsule is reduced, which places fewer restraints on the design of the capsule floor and the arrangements for capsule access.

Figure 7:
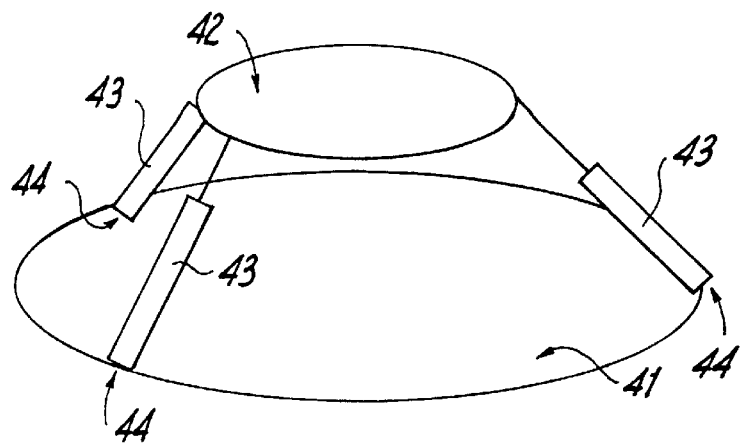
FIG. 7 is a schematic perspective view of a motion-imparting device formed in accordance with the principles of the present invention.

The mechanism shown in FIG. 6 has, however, the disadvantage that under some extremes of motion the angle between the motion platform 42 and the horizontal may be greater than the angle between at least one of the rams 43 and the horizontal—so that in consequence the mechanism toggles into a locked position. In order to prevent this, the relative dimensions of the upper motion platform 42, the lower motion platform 41 and the lengths of the rams are so proportioned that toggle action cannot occur. In general, the ratio of the size of the fixed platform 41 to that of the moving platform 42 is reduced. FIG. 7 illustrates this improvement, the elements of the mechanism having the same reference numerals as in the embodiment of FIG. 6.

Figure 8:
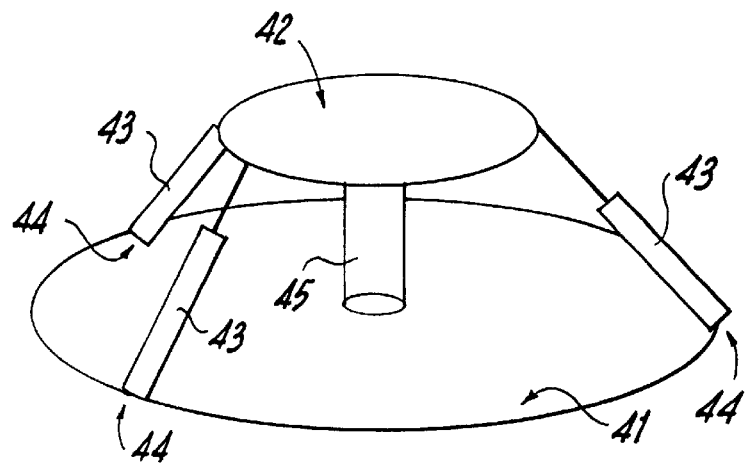
FIG. 8 is a schematic perspective view of a further embodiment of the present invention.

FIG. 8 shows an embodiment having a central, vertical compliant support member or assembly 45 by which the static load of the motion platform 42 is counteracted so as to remove the requirement for the electromagnetic rams 43 to generate a continuous force. It will be appreciated that the vertical spring rate of the central compliant support member will need to be optimised in accordance with the general design of the motion base and its operating parameters. If the support member is a gas spring actuator it may be necessary for it co communicate with an adjacent pressurised gas reservoir (not shown) of the appropriate volume.

Alternatively, the single, vertical actuator may be replaced or assisted by two or more actuators angled inwards towards the centroid of the motion triangle, being proportioned so as to rotate through an angle in a vertical plane as the motion platform rises and falls. The angled actuators may be pre-pressurised gas struts such as those used to support a car boot lid, so arranged as to have an over-centre action that may be used to clamp the motion platform in the loading position when necessary.

Figure 9:
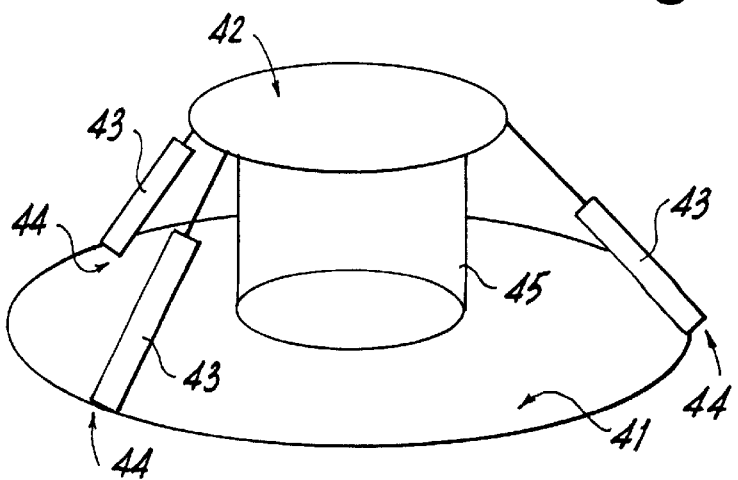
FIG. 9 is a schematic perspective view of a further embodiment of the present invention.

FIG. 9 shows an embodiment with a central, vertical bellows unit by which the deadload of the motion platform 42 is counteracted so as to remove the requirement for the electromagnetic rams 43 to generate a continuous force. It will be appreciated that the vertical spring rate of the central bellows must be optimised in accordance with the general design of the motion base and its operating parameters. This means that the flexible part of the bellows may be mounted on a central rigid plinth of a chosen height. (The rigid plinth is not shown separately in FIG. 8).

The spring action of the bellows may be enhanced by two or more proprietary gas struts (not shown), so arranged as to rotate through an angle in a vertical plane as the motion platform rises and falls. These may be so contrived as to have an over-centre action that may be used to clamp the motion platform in the loading (lowest) position when necessary, without the requirement to de-pressurise the bellows unit, thus reducing the consumption of compressed air.

It will be understood that the use of a bellows unit as the central restraint member does not preclude any arrangements for the mounting and connection of the electromagnetic actuators so that they may also act as individual gas springs, instead of or in combination with the force generated by the bellows and/or gas struts. When the electromagnetic actuators are also used as gas spring elements it is preferable that means are provided for the frequent adjustment of the pressure so as to minimise the long-term integral of the actuator current—and thus the power consumption.

The motion-imparting device of the invention consists of a mechanism in which one of the members (the base platform) may be considered to be stationary and the other member (the motion platform) may be considered to be positioned by means of the actuators.

Figure 10:
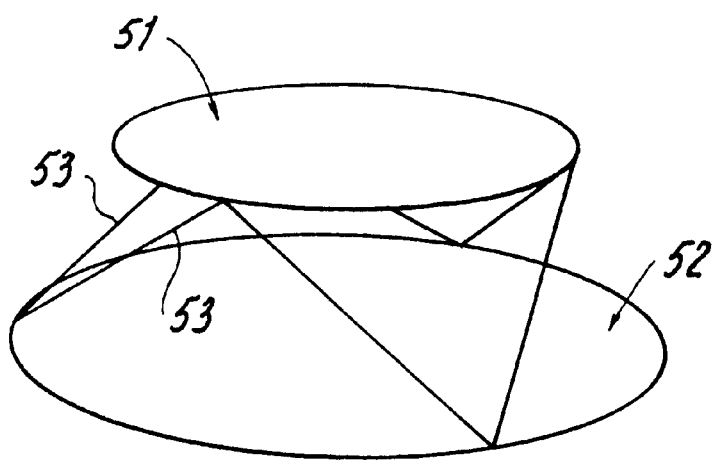
FIG. 10 is a simplified diagram of a Stewart platform formed as a further embodiment of the present invention.
Figure 11:
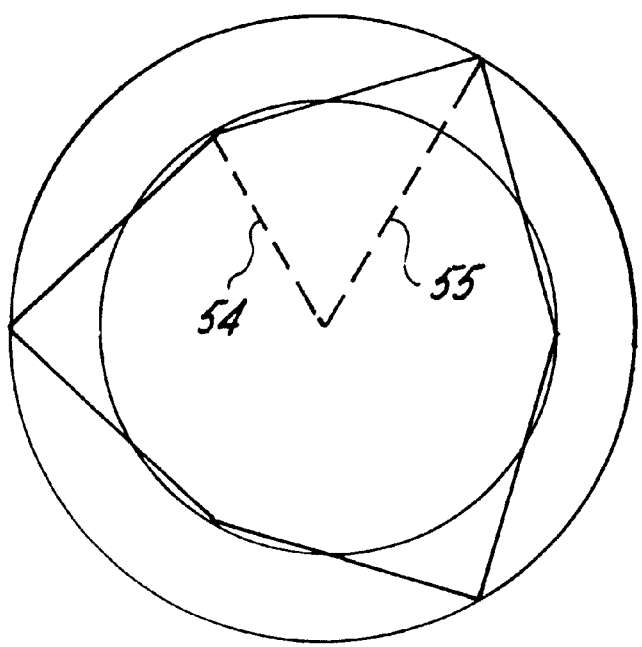
FIG. 11 is a plan view from above of the platform illustrated in FIG. 10.

FIG. 10 is a simplified diagram of a Stewart Platform, showing the motion platform 51 supported by rams 53 above the base platform 52. In this diagram the radius 54 of the motion platform circle is smaller than the radius 55 of the base platform. FIG. 11 shows this in plan.

FIGS. 12 and 13 show the conceptual difference between a Stewart Platform in which radius 54 is less than radius 55 as in FIG. 12 and a Stewart Platform in which radius 54 is greater than radius 55, as in FIG. 13. Consider the forces in the gas springs if the motion platform surges forward (to the right in FIG. 6). For the case in which the motion platform is smaller than the base platform, the rams 56 at the "front" of the motion platform are compressed, producing forces that tend to push the edge of the platform upwards, whilst the rams 57 at the "rear" of the platform are extended, reducing the upwards component of their force and allowing the trailing edge of the motion platform to fall. Such an arrangement would therefore be expected to cause the motion platform to pitch upwards when surging forwards (FIG. 16).

Conversely, by similar reasoning, the behaviour of a mechanism in which the radius of the motion platform is greater than that of the base platform would be expected to cause the motion platform to pitch downwards when surging forwards (FIG. 17).

Figure 18:
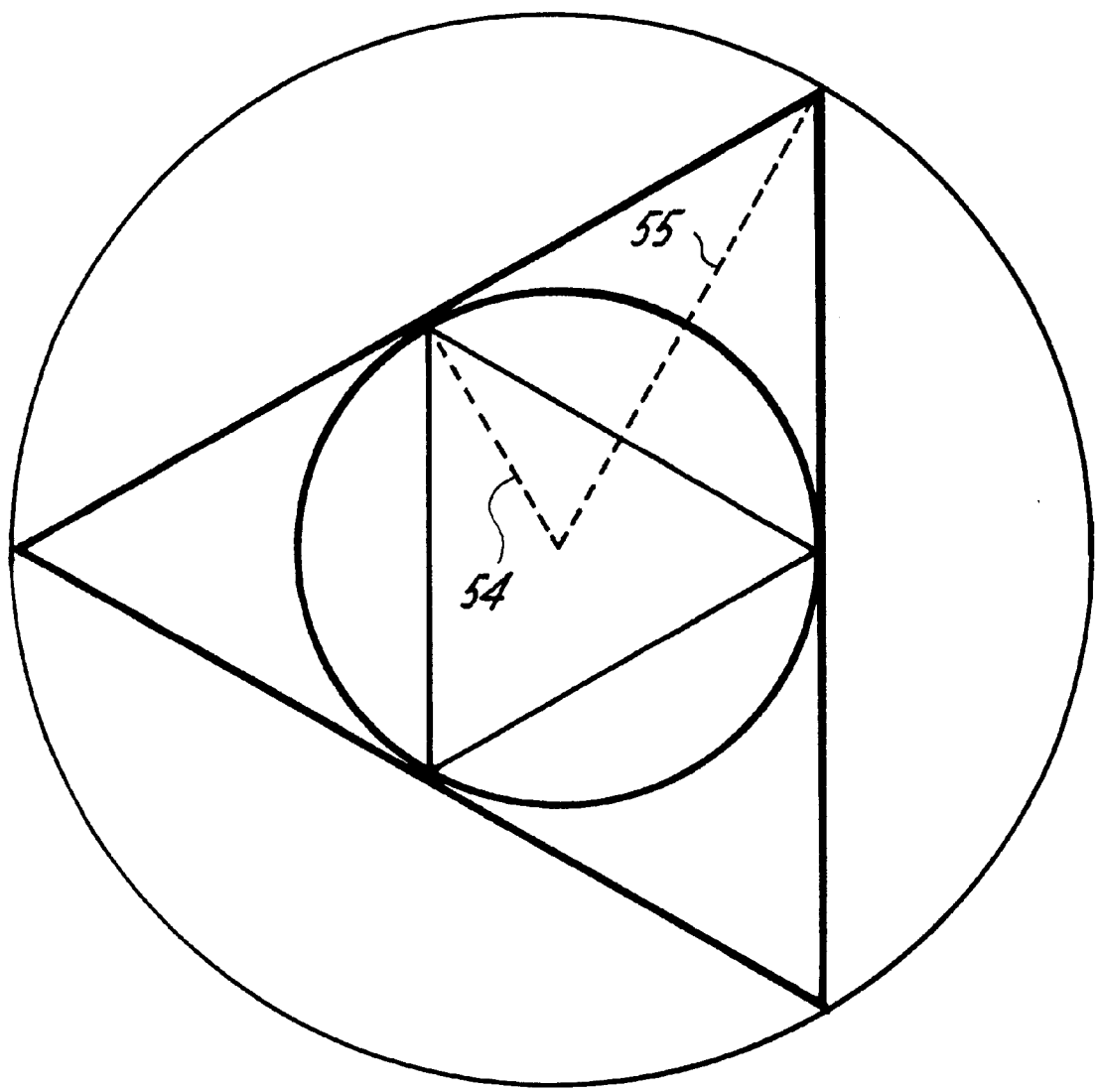
FIG. 18 is a schematic plan view illustrating the anticipated optimum dimensions of a Stewart platform formed as an embodiment of the invention.

It follows, therefore, that between the two extremes there must be an optimum configuration in which a surging movement causes neither climbing nor diving tendencies. When any given set of ram dimensions is taken into account, the optimum ratio of lower platform size to upper platform size would be expected to be 2:1, as shown in the simplified diagram of FIG. 18.

Figure 19:
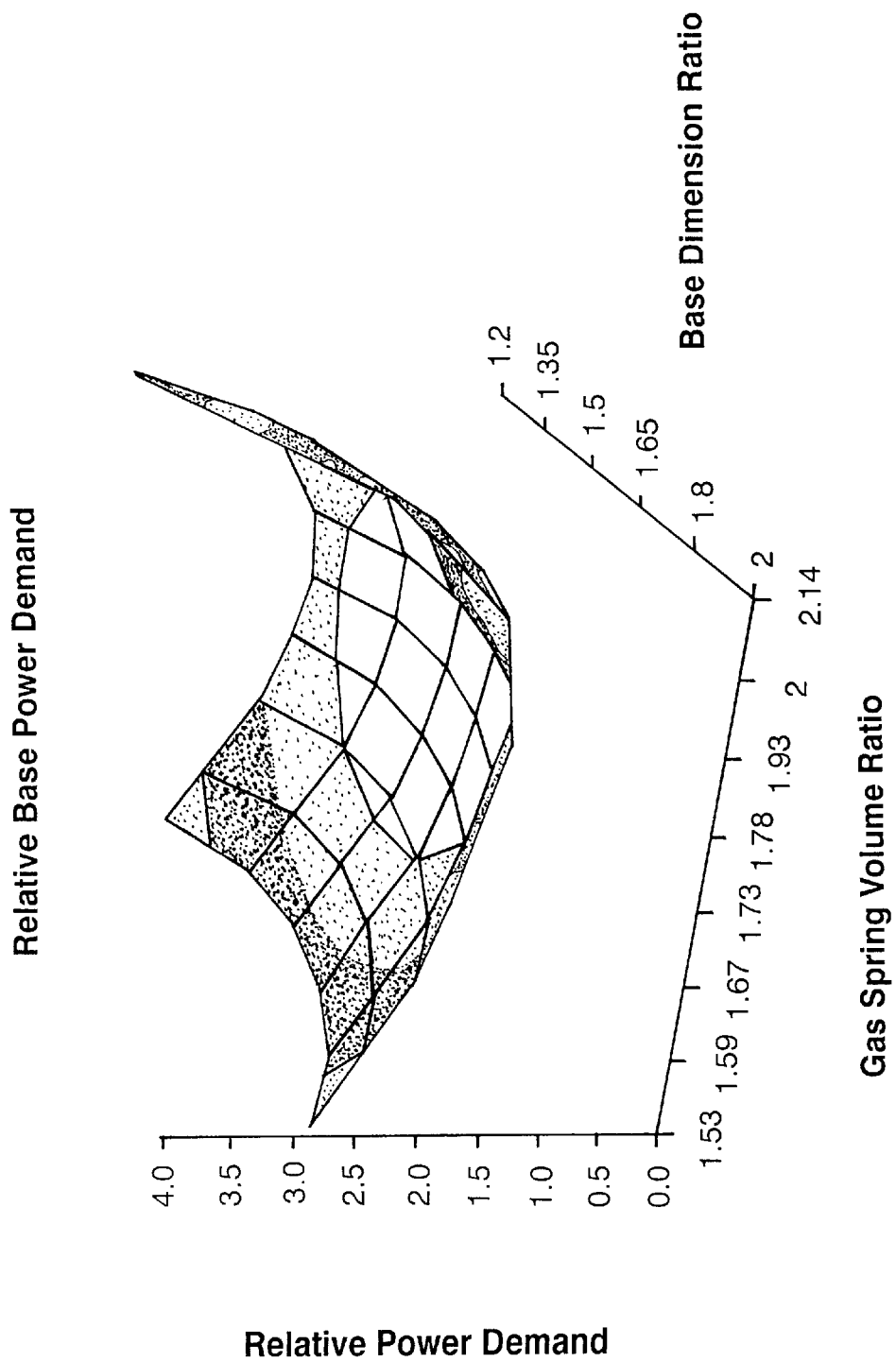
FIG. 19 is a three-dimensional plot of the power consumption of a typical Stewart platform motion-imparting apparatus formed as an embodiment of the present invention.

FIG. 19 is a three-dimensional plot of the power consumption of a typical Stewart Platform motion base for a reasonable simultaneous combination of all six possible movements (heave, surge, sway, pitch, roll and yaw). One axis shows how the power consumption of the motion base varies with the size ratio of the fixed and moving platforms and the other axis shows how it varies with the volume ratio of the gas spring system (or with the spring rate of an equivalent solid spring system).

It will be seen that the best platform size ratio lies in the region of 1.5 and that the best gas spring ratio lies in the region of 1.8. This is true for all the types of ram and motion base so far examined.

Figure 20:
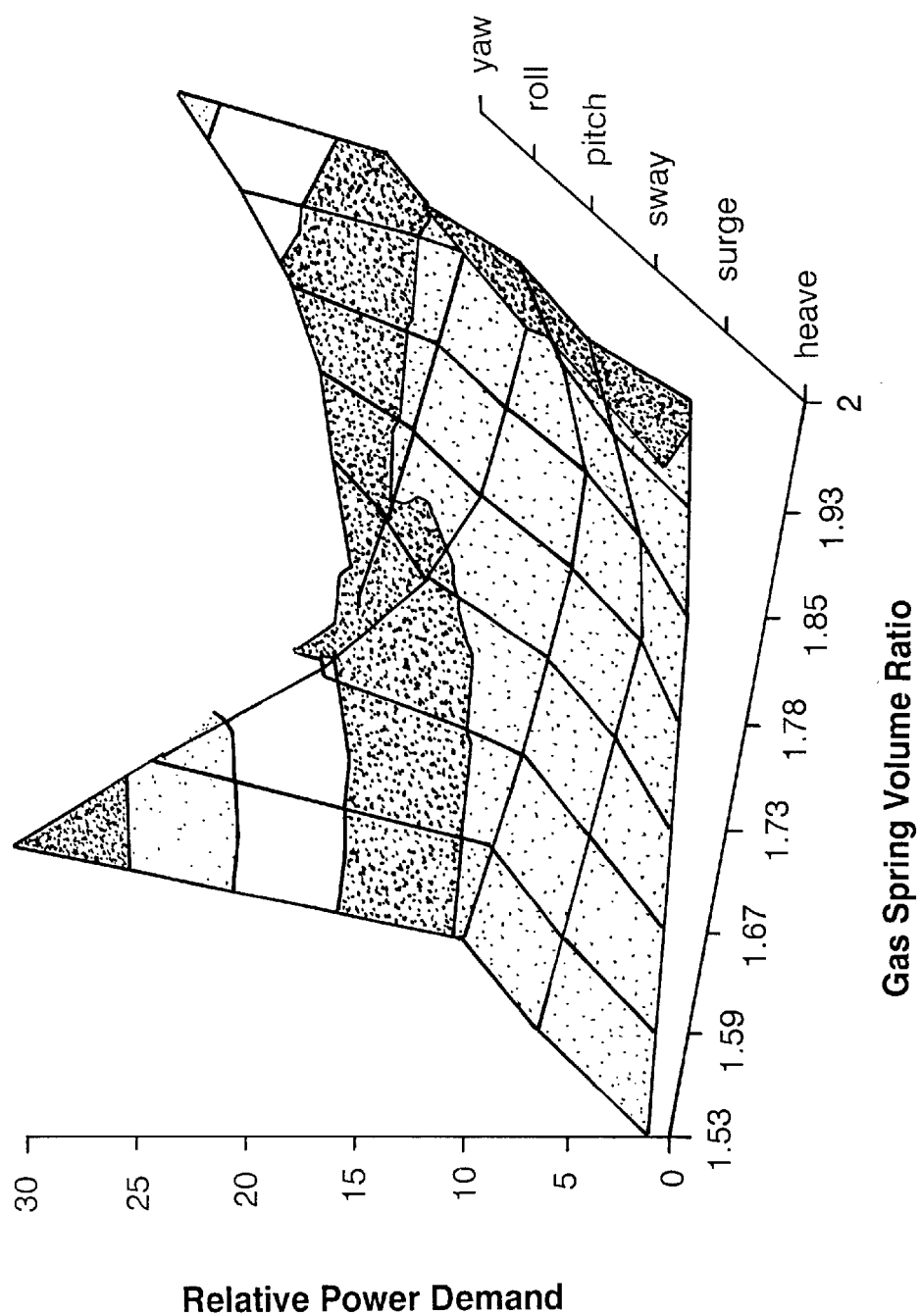
FIG. 20 is a diagram illustrating how the power demand on the actuators varies with the type of motion.

FIG. 20 shows how ram power demands vary with type of motion and the "springiness" of the mechanism, as determined by the ratio of gas spring volumes. It should be noted that a soft or "counterbalanced" motion base would have a large gas spring reservoir and a small volume ratio and lie to the left of the diagram, whilst a "hard-sprung" motion base would lie to the right. As expected, the power consumption rises sharply for all motions as the hardness of the springing increases at the edge of the diagram.

Nevertheless, it will be noted that the power consumed by a pitching motion is very great when the springing is optimised for the heave motion, that is when the mechanism is "counterbalanced". It will also be noted that the power consumed by the pitching motion can be very much reduced by increasing the springiness of the system to an optimum value, which is less than that at which the "hard" springing forces begin to dominate. There are similar optimum suspension characteristics for the other modes of base motion but the pitch motion is dominant. (It will be remembered that the concept of WO93/01577 failed principally in the pitch mode.) It will be understood that whilst the principles of this invention have been expounded with reference to the six-axis motion system known as the Stewart Platform, they relate equally to motion bases of other kinds, such as the three-axis system referred-to in WO93/01577 and to various other designs of motion base described in our co-pending patent applications.

It will be further understood that the simulator mechanism has a mirror image equivalent in the stabilised platform, in which (e.g.)the lower platform is subjected to movements that must be negated by the relative motions of the rams so as to maintain the upper platform stationary. The optimised design of the motion base mechanism that is described herein therefore relates equally to stabilised platforms based on a Stewart configuration and the principles in general relate to stabilised platforms of other kinds.

Figure 21A:
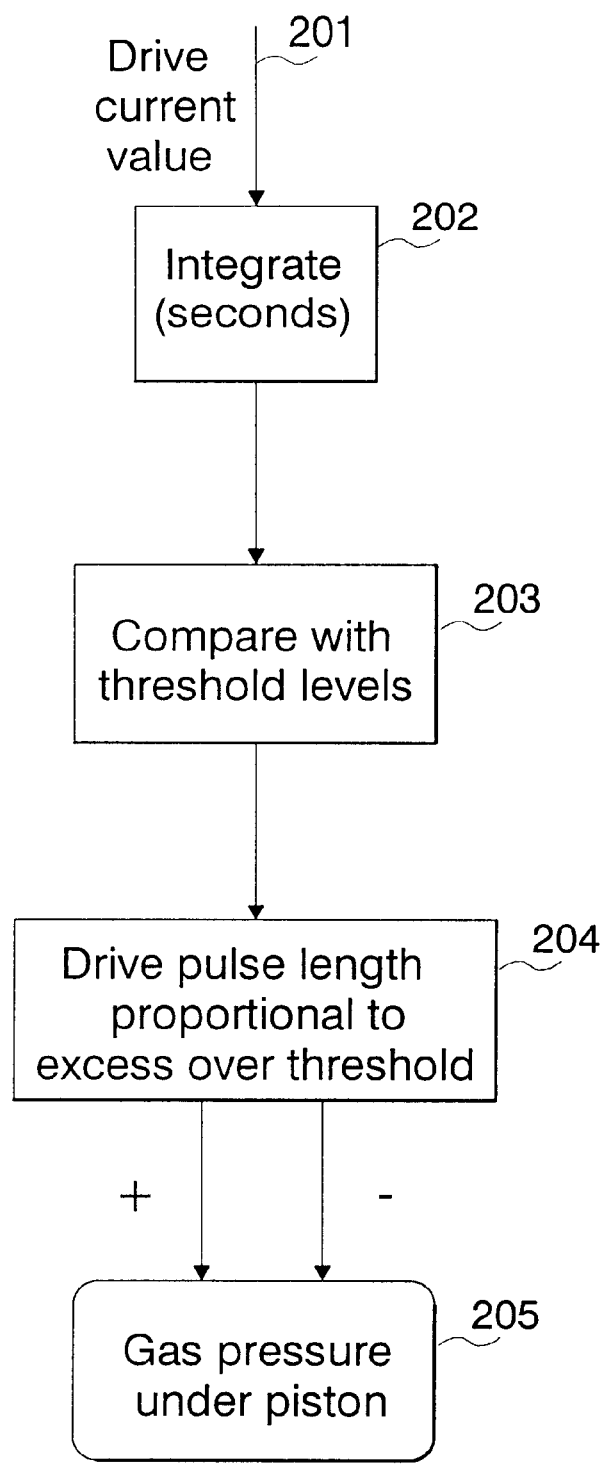
FIGS. 21A and 21B are diagrams illustrating control sequences for actuators formed as embodiments of the present invention.

Turning now to FIG. 21A this shows the main sequence of control functions of an electromagnetic actuator with an associated or incorporated compliant support in which the compliance is variable to take account of varying parameters such as instantaneous position, demand position, load, acceleration, velocity etc. In this embodiment the compliance is varied in dependence on instantaneous load, which is determined as a function of the current drawn by the electromagnetic actuator in responding to demand signals. FIG. 21A shows the sequence of steps followed in varying the compliance of a gas spring. At step 201 the drive current, sensed by suitable sensors is applied an input to the control system. This signal Is integrated at step 202 as a rolling integral over successive sampling periods the length of which depends on the specific circumstances but which may be, for example, in the region of three seconds in the case of an entertainment motion base.

The integral thus formed is then compared with predetermined threshold values at step 203. The excess over the threshold (if it exists) then controls the generation of a control signal or 'drive pulse' the length of which is proportional to the excess. This signal controls the opening of a valve to admit or release gas from the closed chamber of a gas spring (not shown) associated with an electromagnetic actuator in any of the ways described hereinabove. This varies the support given to the load by the gas spring by continually varying or "tuning" its compliance to the dynamic status of the actuator. If, for example, an actuator is extending rapidly, the valve is opened to allow ingress of gas to a chamber the volume of which is increasing whereby to reduce the resistance to motion which would otherwise be exerted. The thresholds are selected such that the "tuning" of the gas spring takes account of the possibility of short term return motion so that the chamber does not have gas admitted thereto which must be immediately released, but rather the determination of the requirement for introduction or release of gas is computed over sufficient time to smooth out rapid transients.

Figure 21B:
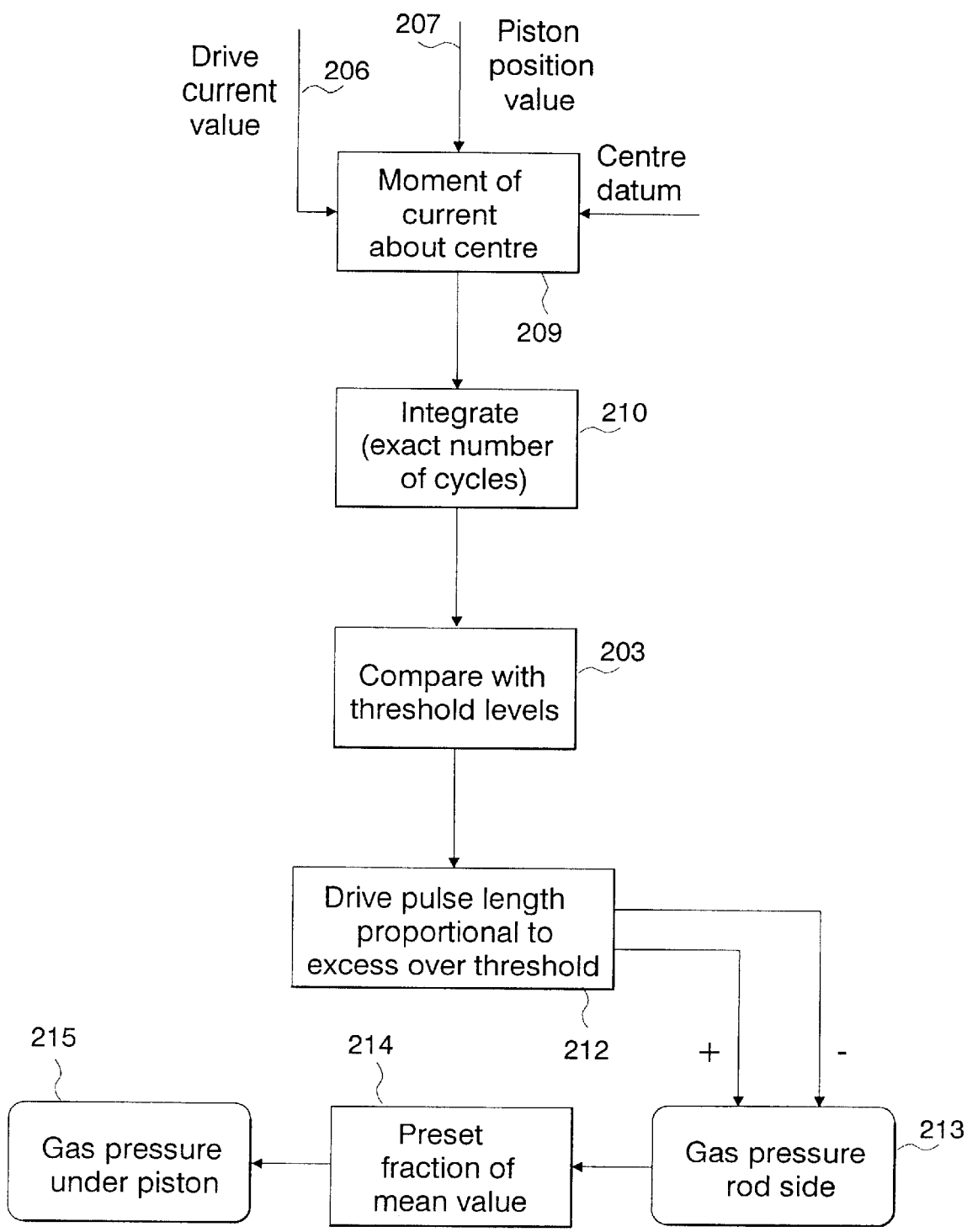

In FIG. 21B there is shown the major steps in a system for supporting a reciprocating mass the displacement of which is driven by an electromagnetic actuator. As for a motion base the drive current in the electromagnetic actuator is detected and applied at 206, but in this case the position of a reciprocating piston or other reciprocating member of the actuator is detected at 207 and, furthermore, the centre datum signal 208 is also applied at step 209. From these signals a calculation is made of the moment of current about the centre position of the moving member, following which, at step 210, an integral is formed of the drive current value for a time period which represents an exact number of cycles of the reciprocating mass, with a time override to cope with the cessation of motion.

As before, this integral is compared with threshold values at step 211 and the drive pulse length of a signal applied to a valve is determined at step 212. This signal is applied to one side of the piston, in this case the gas pressure rod side represented at step 213, and the pressure as a predetermined fraction of the mean pressure value is determined at step 214 to determine the required gas pressure on the other side of the piston at step 215 to balance the variations which are introduced into the chamber on the first side of the piston.

What is claimed is:

1. An apparatus for imparting a motion to a load, during an operation of said apparatus relative to a reference plane, said apparatus comprising:

means for applying a perturbing force to said load during said operation of said apparatus;

means for providing a compliant support to said load throughout said operation; and said means for providing a compliant support including means for effecting a dynamic variation in a compliance of said compliant support throughout said operation and an application of said perturbing force to said load.

2. An apparatus for imparting, according to claim 1, wherein:

said means for applying said perturbing force to said load includes at east one actuator;

said actuator controlling a position of said load within at least one degree free of freedom relative to said reference plane;

said means for providing a compliant support including means for applying a perturbing force to said load in addition to said perturbing force during said operation;

means for controlling both said means for applying a perturbing force and said means for providing a compliant support, throughout said operation; and said means for controlling cooperatively communicating with each said means during said operation based upon at least a feedback from each said means, and minimizing an energy consumption of said apparatus while improving stability of operation.

3. An apparatus for imparting, according to claim 2, wherein:

said actuator in said means for applying said perturbing force is at least an electromagnetic actuator.

4. An apparatus for imparting, according to claim 3, wherein:

said electromagnetic actuator in said means for applying said perturbing forces is at least a linear electromagnetic actuator.

5. An apparatus for imparting, according to claim 3, wherein:

said means for applying a perturbing force requires a discernable amount electrical current to perturb said load relative to said reference plane during said operation;

said means for controlling effective to continually discern said amount of electrical current as at least a first part of said feedback; and said means for controlling controlling said means for providing a compliant support during said operation based upon said amount of electrical current.

6. An apparatus for imparting, according to claim 3, wherein:

said means for controlling determining and controlling a position signal of said electromagnetic actuator during said operation; and said means for controlling providing an integral calculation of said position signal and implementing a dynamic variation in said compliance based upon at least said integral calculation during said operation.

7. An apparatus for imparting, according to claim 2, wherein:

said means for providing a compliant support includes at least a gas spring;

said gas spring having at least one chamber;

said chamber having at least a variable volume during said operation;

at least one valve operably providing a gas-communication with said chamber;

said means for controlling including a means for dynamically and continuously controlling said at least one valve and a mass of a gas within said chamber throughout said operation; and said means for controlling providing a dynamic variation of said at least one valve and said mass, whereby said means for controlling matches said compliance with a predetermined continuously changing value during said operation of said means for applying a perturbing force.

8. An apparatus for imparting, according to claim 2, wherein:

said means for applying and said means for providing operate coaxially with respect to said load during said operation.

9. An apparatus for controlling motion, in a plurality of degrees of freedom between a platform and a predetermined fixed reference plane, comprising:

compliant means for supporting a weight of said platform during an operation of said apparatus;

at least one actuator means for applying a perturbing force between said platform and said reference plane during said operation;

control means for controlling said at least said actuator means during said operation;

a compliance of said compliant support means being controllably variable throughout said operation; and means for dynamically and continuously varying said compliance base upon signals received from at least said means for controlling during said operation.

10. An apparatus, according to claim 9, further comprising:

at least a first pivotal connector;

said first pivotal connector operatively joining a first end of said at least one actuator to said reference plane; and said at least first pivotal connector constraining said at least one actuator to operation about said at least first pivotal connector within a first respective plane.

11. An apparatus, according to claim 9, further comprising:

at least a first support member in said compliant means for supporting said weight of said platform;

at least a first connector;

said at least first connector operatively joining said at least first support member at least a first position between said reference plane and said platform; and said at least first connector providing said at least first support member with a universal freedom of movement between said platform and said reference plane during said operation.

12. An apparatus, according to claim 11, wherein:

said means for dynamically and continuously varying controlling said at least first support member to a determined compliance based upon a set of predetermined platform parameters.

13. An apparatus, according to claim 12, wherein:

an inclination, defined between said at least one actuator means and said platform at an apparatus rest position, prior to said operation, is between 40° and 50°.

14. An apparatus for controlling motion, in a plurality of degrees of freedom between a platform and a predetermined fixed reference plane, during an operation of said apparatus, comprising:

means for supporting a weight of said platform during said operation;

at least one actuator means for operably joining said platform and said fixed reference plane and for providing at least one perturbing force between said platform and said fixed reference plane;

control means for controlling at least said one actuator means during said operation;

said control means controlling said at least one actuator means and varying at least one of a position and an orientation of said platform relative to said fixed reference plane during said operation;

said means for supporting said weight including at least one compliant support means for dynamically and continuously varying a compliance of said means for supporting during said operation;

at least one compliant support means operating in conjunction with each said at least one actuator means; and said control means operating each said compliant support means in coordination with respective each actuator means during said operation.

15. An apparatus, according to claim 14, further comprising:

a plurality of actuator means including said at least one actuator means;

first ends of each said actuator means attached to and circumscribing a first circle on said platform;

second ends of each said actuator means attached to and circumscribing a second circle on said fixed reference plane; and a ratio of a first diameter of said first circle on said platform to a second diameter of said second circle on said fixed reference plane is 1:1.5.

16. An apparatus for controlling motion, in a plurality of degrees of freedom between a platform and a predetermined fixed reference plane, during an operation of said apparatus, comprising:

compliant means for supporting a weight of said platform during said operation;

at least one actuator means for joining said platform and said fixed reference plane and for providing at least one perturbing force between said platform and said fixed reference plane during said operation;

control means for controlling said at least one actuator means and varying at least one of a position and an orientation of said platform relative to aid fixed reference plane during said operation; and said control means including means for coordinating a restraint of a non-selected motion of said at least one actuator means during said operation, whereby said control means, said compliant means and said actuator means improve a stability and a repeatability of said operation.

17. An apparatus, according to claim 16, wherein:

said means for coordinating a restraint includes at least a first bellows unit.

* * * * *

UNITED STATES PATENT AND TRADEMARK OFFICE
CERTIFICATE OF CORRECTION

PATENT NO.    : 6,468,082 B1
DATED         : October 22, 2002
INVENTOR(S)   : Phillip R. Michael, Denne It is certified that error appears in the above-identified patent and that said Letters Patent is hereby corrected as shown below:

<u>Title page,</u>
Item [30], Foreign Application Priority Data, delete "9727446" and substitute -- 9727443 --

Signed and Sealed this

Twentieth Day of May, 2003

JAMES E. ROGAN
*Director of the United States Patent and Trademark Office*